United States Patent [19]

Petersen

[11] 4,158,879
[45] Jun. 19, 1979

[54] FLIP FLASH HAVING FINAL FLASH SIGNAL

[75] Inventor: Christian C. Petersen, Westwood, Mass.

[73] Assignee: Polaroid Corporation, Cambridge, Mass.

[21] Appl. No.: 805,015

[22] Filed: Jun. 9, 1977

Related U.S. Application Data

[63] Continuation-in-part of Ser. No. 708,487, Jul. 26, 1976, abandoned.

[51] Int. Cl.² .............................................. G03B 15/02
[52] U.S. Cl. ....................................... 362/13; 354/128; 431/359
[58] Field of Search ............... 354/126, 127, 128, 132, 354/139, 143, 148, 149; 362/5, 6, 11, 13, 15; 431/95 R, 95 A

[56] References Cited

U.S. PATENT DOCUMENTS

| | | | |
|---|---|---|---|
| 3,567,351 | 3/1971 | Harvey | 431/93 X |
| 3,692,995 | 9/1972 | Wagner | 362/13 |
| 3,707,903 | 1/1973 | Weber | 354/128 |
| 3,728,068 | 4/1973 | Cote | 431/95 |
| 3,952,320 | 4/1976 | Blount | 354/126 |
| 4,005,449 | 1/1977 | Ellon | 362/13 X |
| 4,048,487 | 9/1977 | Kewely | 362/13 |
| 4,064,431 | 12/1977 | Cote | 362/13 X |

FOREIGN PATENT DOCUMENTS 1246394 10/1965 Fed. Rep. of Germany ........... 354/132

Primary Examiner—L. T. Hix
Assistant Examiner—William B. Perkey
Attorney, Agent, or Firm—David R. Thornton

[57] ABSTRACT

A photoflash unit for use with a camera having a shutter mechanism, a firing pulse source, and an inhibiting arrangement connected to the shutter mechanism, the inhibiting arrangement including a detecting network for sensing first and second resistance conditions, and, in response to the second resistance condition, for inhibiting operation of the shutter mechanism. The unit comprises a multiple array of photoflash lamps adapted for connection of a given array to the firing pulse source and arranged with each lamp of the array to be fired individually and sequentially thereby, and including a radiant energy responsive switch positioned adjacent the last lamp of the given array so as to initially provide the first resistance condition, and then provide the second resistance condition in response to the firing of the last lamp.

8 Claims, 9 Drawing Figures

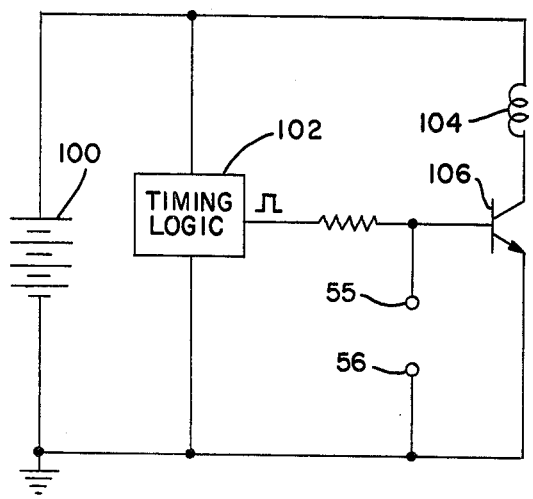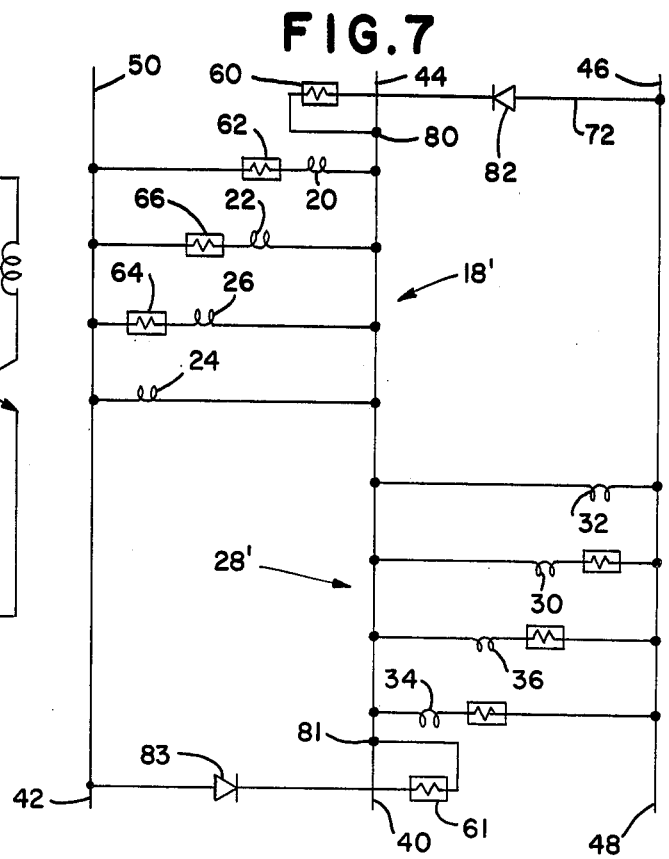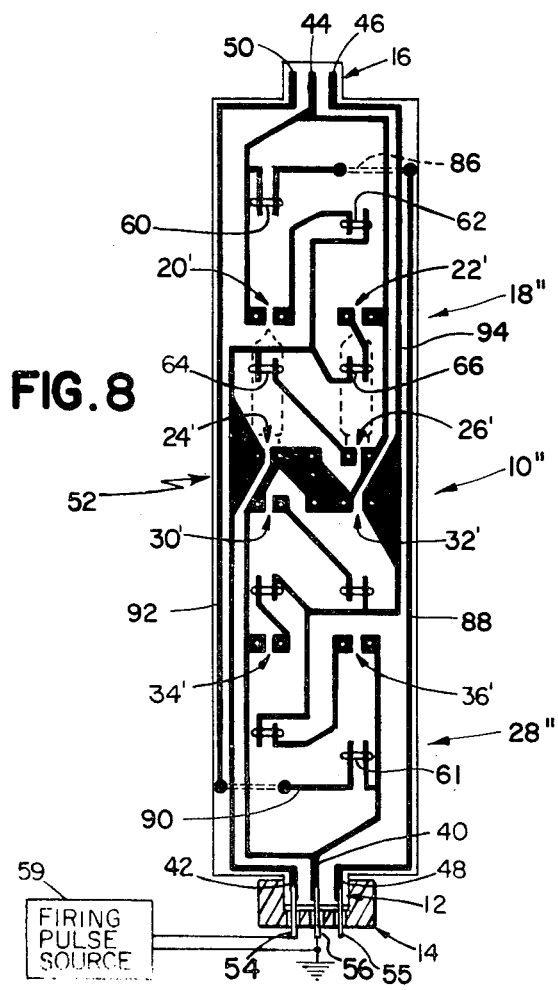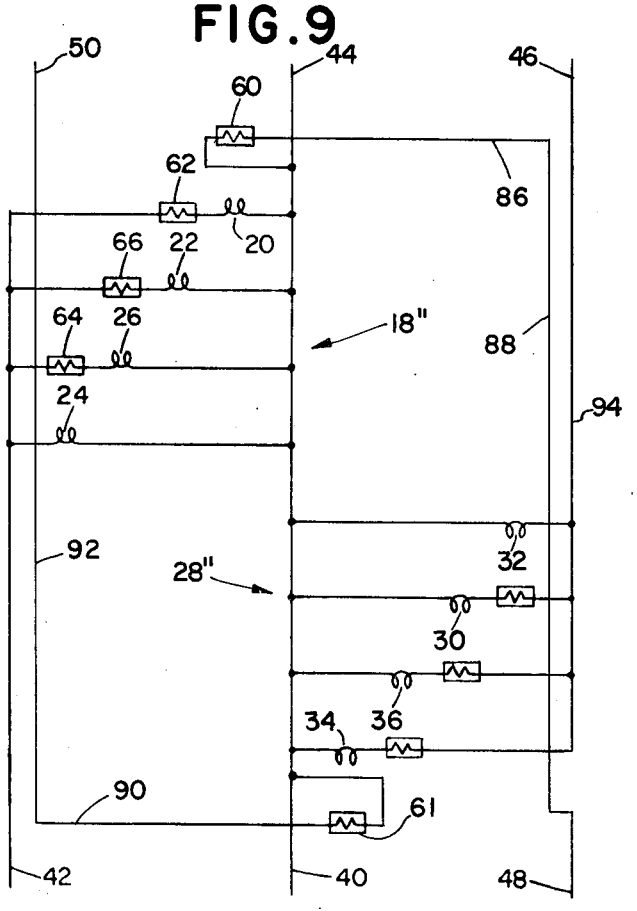

FLIP FLASH HAVING FINAL FLASH SIGNAL

CROSS-REFERENCE TO RELATED APPLICATION

This application is a continuation-in-part of U.S. application Ser. No. 708,487, filed on July 26, 1976, now abandoned.

BACKGROUND OF THE INVENTION

This invention relates to multiple photoflash lamp units, such as flashcubes and planar arrays of the type which are adapted to be temporarily attached to a camera.

It is not always possible to determine from the appearance of the lamps whether they have been fired. Therefore, when multiple flash lamp units are used, the photographer must remember how many lamps of the unit have been fired. If the operator initiates a film exposure requiring flash illumination when there is no unfired lamp available, the film exposure is wasted.

U.S. Pat. Nos. 3,894,226 to Hanson and 3,952,320 to Blount disclose a multiple flash lamp unit having two arrays each of four lamps. This unit can be connected to a camera in two orientations, in each of which one array of the flash lamps is farther from the camera lens axis than are the lamps of the other array. The lamps and electrical circuitry are arranged so that in each orientation of the unit with respect to the camera, only the group of lamps farther from the lens axis can be flashed. The purpose of this arrangement is to position the "active" group of flash lamps further above the camera lens, in order to reduce the possibility of a "red-eye" effect, in which the pupils of a person's eyes appear red or pink in pictures taken by flash when the flash lamp is close to the camera lens.

When flash lamp units of this type are used, the problem of remembering how many lamps have been fired is more severe, since the operator must keep track of how many lamps have been fired in a particular orientation of the unit. If the operator removes the unit to reverse its position, it may easily be incorrectly replaced with no unfired lamp available.

Since lamps of the type employed in the flash unit described herein present a very high resistance both before and after firing, it has not been practical to employ simple electric circuitry in the camera to detect the resistance condition of the lamps in the flash unit. Circuitry capable of distinguishing the fired from unfired condition would greatly increase the cost of the camera with which the flash unit is employed.

Some multiple flash lamp units have provided mechanically, thermally, or electrically actuated visible signals, intended to warn the operator when all lamps have been fired. Such designs have not been wholly satisfactory, because the signal may be overlooked and the film exposed in spite of the signal.

It is therefore an object of this invention to provide a multiple photoflash lamp unit that includes means for indicating that no unfired lamp is available.

Another object is to provide a lamp unit including multiple lamps whose resistance is not substantially altered by firing, having means for automatically providing an electrically detectable signal at completing of lamp firing.

It is a further object of this invention to provide a dual array photoflash unit, reversible between two orientations with respect to the camera, with means for indicating that no unfired lamp is available in a given array orientation.

To achieve these objects, a photoflash unit is provided for use with a camera having selectively operative means for providing film exposure, a firing pulse source, and inhibiting means coupled to the film exposure means and including resistance condition detecting means for sensing first and second resistance conditions of said photoflash unit and in response to the second resistance condition for inhibiting operation of the film exposure means.

The photoflash unit comprises an array of photoflash lamps adapted to be connected to said firing pulse source and arranged to be fired individually and sequentially thereby, and including a last lamp arranged to be fired last. According to the invention, the photoflash unit further comprises radiant energy responsive switching means, disposed to receive radiant energy emitted by the last lamp, to initially provide the first resistance condition and, responsive to firing of the last lamp, to provide the second resistance condition.

In preferred embodiments, the photoflash unit further provides first and second electric terminals adapted to be connected to the camera firing pulse source, the photoflash lamps being connected between the first and second terminals. The unit also provides a third terminal adapted to be connected to the camera resistance condition detecting means, and the radiant energy responsive switching means is connected between the third terminal and one of the other two. The switching means initially provides an open circuit or high resistance condition, and provides a low resistance or short circuit condition responsive to firing of the last lamp of the array.

BRIEF DESCRIPTION OF THE DRAWINGS

FIG. 6 is a schematic diagram of circuitry in a camera designed to employ the unit of the invention;

FIG. 7 is a schematic diagram of an alternate embodiment of the flash unit wherein a last flash indication is provided between the terminals of the unused array;

FIG. 8 is a diagrammatic front view of the circuit board of another embodiment of the invention wherein a last flash indication is provided between a common terminal and a separate indicator terminal; and FIG. 9 is a schematic diagram of the circuit of a flash unit embodying the circuit board of FIG. 8.

DESCRIPTION OF THE PREFERRED EMBODIMENT

Figure 1:
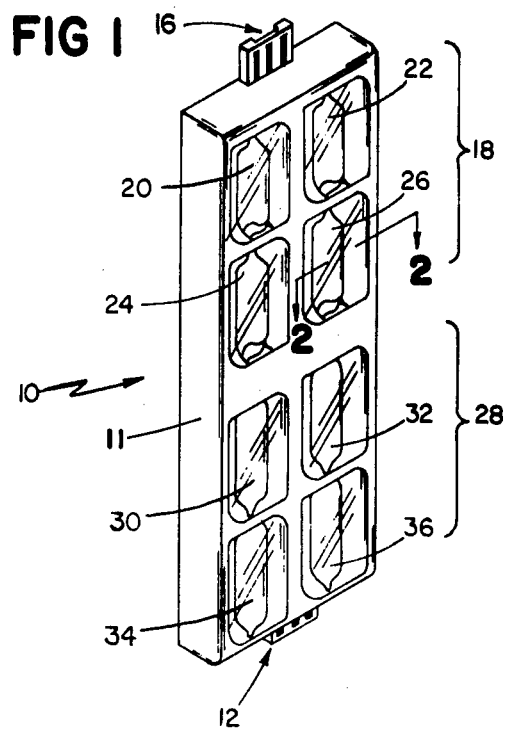
FIG. 1 is a perspective view of a multiple flash unit constructed in accordance with a preferred embodiment of the invention wherein a last flash indication is provided between the outer terminals of the unit.

A multiple flash lamp unit 10, shown as being of the planar array type having an elongated body or member 11 and containing eight electrically fireable flash lamps, is provided with a first plug-in connector tab 12 at one end, adapted to fit into a coupler such as a socket 14

(FIG. 3) of a camera or flash adapter. The lamp unit 10 is provided with a second plug-in connector tab 16 at its other end. The unit 10 is adapted to be attached to socket 14 in either of two orientations, i.e., with either tab 12 or tab 16 plugged into the socket 14. The unit 10 is provided with a first array 18 of flash lamps 20, 22, 24 and 26, and a second array 28 of flash lamps 30, 32, 34 and 36. Reflectors 38 are provided behind the flash lamps, so that as each lamp is flashed, its light is projected outward from the unit 10. The relationship of each reflector to its associated lamp, and a suitable plastic housing and transparent front cover, may be generally that disclosed in the planar array patents referred to above. The lamps have a high value of resistance both before and after they are fired.

Figure 3:
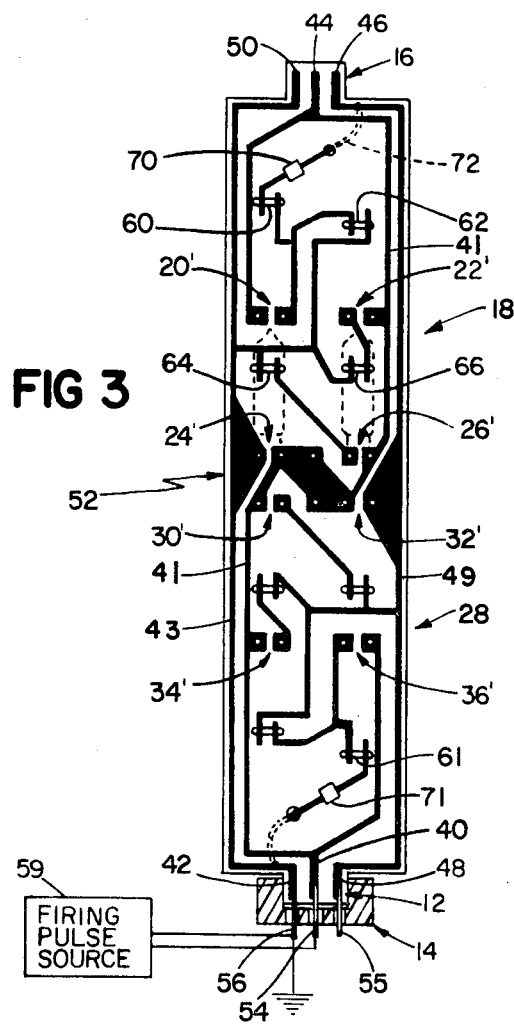
FIG. 3 is a diagrammatic front view of a circuit board employed in the multiple lamp unit of FIG. 1, shown plugged into a camera socket.

With the unit 10 oriented and plugged into the socket 14 as shown in FIG. 3, only the lamps of array 18 can be flashed, and the four lamps of the array 28 are made inactive and will not flash. The undesirable red-eye effect is thereby reduced or eliminated, since the only lamps that can flash are grouped relatively far from the socket 14 and from the axis of the camera's lens. The unit 10 can be removed from socket 14, either before or after all lamps of array 18 have been flashed, turned around, and reinserted in socket 14 by means of tab 16. Array 28 of lamps then becomes the active array, and its lamps may be flashed.

Figure 5:
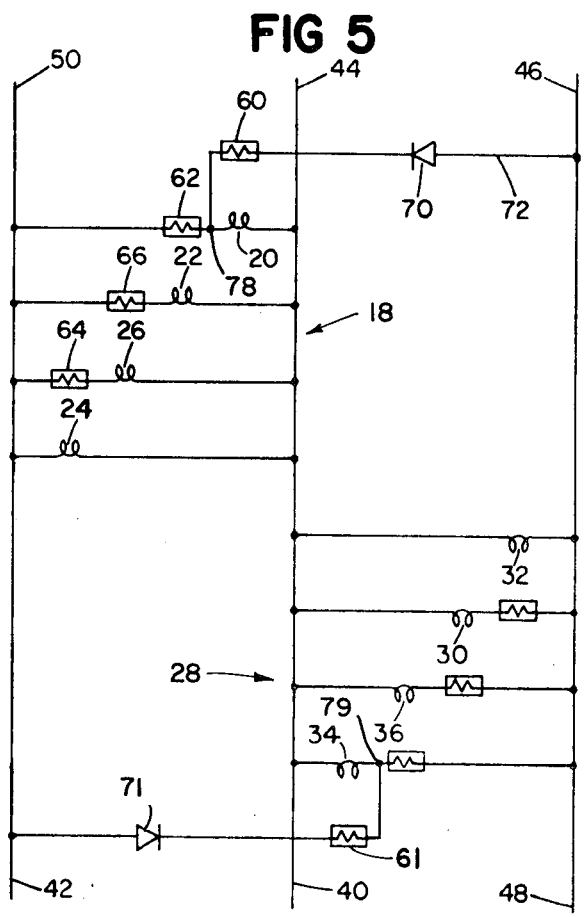
FIG. 5 is a schematic diagram of the circuitry of the unit shown in FIG. 1.

As seen more clearly in FIGS. 3 and 5, electrical connector terminals are provided on each of the tabs 14 and 16 with the terminals of one tab connected to those of the other. Tab 12 includes three terminals a first terminal 40, a second terminal 42 and a third terminal 48 which are connected by appropriate paths on the circuit board 52, to terminals 50, 44 and 46, respectively, of the tab 16. The central terminals 40 and 44 of each tab are common terminals connected in common by a first conductive run 41 to both arrays 18 and 28 while terminals 42 and 50 are coupled by a second conductive run 43 to array 18 and terminals 48 and 46 by a third conductive run 49 to array 28. Additionally, as later explained in detail with regard to FIG. 5, the outer terminals of each tab, e.g., terminals 42 and 48, are interconnected by actuatable inhibit circuits.

FIG. 3 shows the circuit board 52 that is contained within the housing of unit 10 behind reflectors 38. Board 52 supports the flash lamps by their lead-in wires and provides for sequential firing of each array of lamps. The plug-in connector tabs 12 and 16 may be formed integrally with circuit board 52 at opposite ends thereof, as shown. The top and bottom halves of the printed circuitry are reverse mirror images of each other.

Camera socket 14 for flash unit 10 is provided with a pair of contacts 54 and 56 which respectively electrically engage the terminals 40 and 42 (or 44 and 46 if flipped from the position shown in FIG. 3) of flash unit 10 when it is plugged into socket 14. Socket 14 further provides a third contact 55 which electrically engages terminal 48 (or 50 if flipped).

A firing pulse source 59, which may be contained within a camera or flash adapter, is connected to the contacts 56 and 54 of socket 14.

Firing pulse source 59 may comprise a suitable battery-capacitor discharge and voltage step-up transformer type of circuit, or may employ a compact piezoelectric element arranged to be impacted or stressed in synchronization with opening of the camera shutter, so as to produce a firing pulse having a voltage of approximately 1,000 or 2,000 volts or more and of sufficient energy to fire a single flash lamp. An example of high voltage flash lamp and a firing pulse source comprising a piezoelectric element synchronized with a camera shutter is described in U.S. Pat. Nos. 2,972,937 and 3,106,080, both to C. G. Suits.

The circuit board 52 in FIG. 3 is shown in the orientation in which connector tab 12 is plugged into socket 14, so that circuit board terminals 40 and 42 respectively make electrical contact with the socket contacts 54 and 56. The circuit board terminals 40 and 44 are ends of a continuous conductor run on the board which is connected in common to one electrical lead wire of each of the eight flash lamps in the unit. Lamp 20 is connected at terminals 20', lamp 22 is connected at terminals 22', and so on. Suitable openings are provided through the reflectors and the bases of the lamps to permit connections of the lead-in wires to the circuit board.

Sequential firing of the lamps within array 18 is made possible by the provision of three radiant energy responsive switch elements 62, 64 and 66. Such a switch element is disclosed, for example, in U.S. Pat. No. 3,951,582 to Holub, et al. Suitable material for the switch elements has initially a very high resistance (of the order of megohms), but the resistance becomes very low (of the order to ten ohms) when the material receives radiation in the form of heat and/or light.

Figure 4:
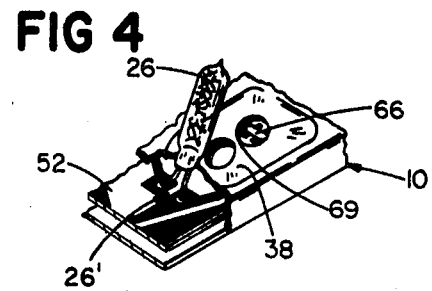
FIG. 4 is a detail view of an individual lamp and portions of the flash unit of FIG. 1.
Figure 2:
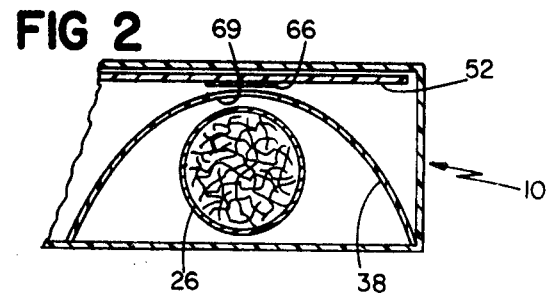
FIG. 2 is a cross-sectional view of a portion of the unit of FIG. 1, taken on the line 2—2 thereof.

The operation of these switches to provide sequential firing of lamps in the array is described in U.S. Pat. No. 3,952,320, referred to above. As seen in FIG. 4, lamp 26 (shown slightly displaced to reveal the switch 66), when connected to terminals 26', overlies switch element 66. A window 69 is provided in reflector 38 to expose switch element 66 to heat and light from bulb 26 when bulb 26 is fired. The switch element responds to the firing of the lamp by changing from an open circuit or high resistance to a closed circuit or low resistance between its switch terminals on the circuit board. Switches 64 and 62 are similarly disposed behind lamps 24 and 22, respectively.

According to the invention, a fourth radiation switch element 60, similar to elements 62, 64 and 66, is disposed behind lamp 20, in the manner shown in FIGS. 4 and 5. Switch element 60 is connected in series with a unidirectional or one-way current device such as a diode 70 from a point designated at 78 between switch element 62 and the lamp 20 to the conductor that runs between circuit board terminals 46 and 48. On printed circuit board 52, a jumper 72 connects diode 70 to conductor run 46-48. A mirror image is also provided for array 28 in that a radiation switch element 61 is located behind lamp 34 in series with a diode 71.

In operation of the flash unit 10, when the last lamp 20 is flashed (radiation switch 62 being previously shorted and lamps 22, 24 and 28 already flashed) switch 60 is closed thereby providing a low resistance circuit between flash unit terminals 48 and 42. The latter, low resistance circuit is sensed by the camera inhibit circuit (later explained with regard to FIG. 6) and further camera operation inhibited. The diode 70 is utilized to permit current flow and sensing in a direction from terminal 48 (from the conductor run between terminals 46 to 48) to terminal 42 while precluding current flow in the opposite direction. The latter thereby providing a high resistance to current flow from terminal 50 to 46 when the array is flipped, and tab 16 coupled to the camera. Any conventional diode of a low voltage rating sufficient to stand the voltage of the sense voltage, or that is, the battery voltage of, for example, 5 volts, will be satisfactory.

As indicated, the lower half of the board 52 is a mirror image of the upper half and includes the diode 71 mounted in reverse polarity to the diode 70. Hence, when sensing between 48 and 42, 48 being positive and 42 being negative or ground, the diode 71 appears as a high resistance to the sense circuit, even if the lower array 28 has previously been fired. Consequently, the diodes 71 and 72 provide unidirectional means associated between each of the outer conductor runs to permit current flow and sensing of a low resistance condition in opposite directions for each array in accordance with the firing connection of that array to the camera.

The circuit of FIGS. 3 and 5 functions as follows. Assuming that none of the four lamps in array 18 has been flashed, the first firing pulse from source 59 will be applied directly to the lead-in wires of the first flash lamp 24. Lamp 24 flashes and becomes and open circuit between its lead-in wires. Heat and/or light radiation from the flashing first lamp 24 causes the resistance of adjacent radiation switch 64 to become very low, thereby connecting the circuit board terminal 42 electrically to the lead-in wire of the second lamp 26. By the time this occurs, the first firing pulse has diminished to a value insufficient to cause second lamp 26 to flash. The next firing pulse is applied to the lead-in wires of the second lamp 26, via the now closed radiation switch 64, whereupon the second lamp 26 flashes, thereby causing the resistance of radiation switch 66 to become low. Second lamp 26 now has an open circuit or high resistance between its lead-in wires. The next firing pulse is applied via now closed radiation switch 66 to the third lamp 22 thereby firing the lamp which becomes an open circuit; the radiation from it causes radiation switch 62 to become essentially a closed circuit across its terminals. The last firing pulse is applied, via now closed radiation switch 62, to the lead-in wires of the fourth and last flash lamp 20, causing this lamp to flash.

When lamp 20 is fired, the radiant energy emitted by it causes switch element 60 to attain a very low value of resistance. Since the latter is in series with the just previously closed switch 62, the diode 70 is now coupled by a low resistance circuit between the second terminal 42 and the third terminal 48. This low resistance condition of array 18 is detected at terminals 42 and 48 by suitable circuitry in the camera or flash adaptor (to be described) and the condition is used to activate inhibiting circuitry, to prevent further exposure of film. Hence, the switch element 60 comprises means responsive to the flashing of the last lamp 20 of the first array 18 for altering the electrical condition between one terminal (e.g. terminal 42) of the first or second terminals 40, 42 and the third terminal 48 to provide an electrically detectable condition at said third terminal following completion of lamp firing of said first array.

The circuitry of FIG. 6 is provided in a camera that employs the photoflash unit of the invention. A battery 100 provides power for the circuitry. Block 102 includes timing logic to determine the duration of the film exposure, and may be of any suitable design. Such timing logic is well known in the art. When solenoid 104 is actuated, exposure of the film is initiated, as by the release of a latch that retains an opening shutter blade.

The resistance condition between flash unit terminals 42 and 48 is input at contacts 56 and 55, respectively, to the circuit of FIG. 6. When the last flash bulb of the array 18 has been fired, the short circuit or low resistance condition across terminals 48 and 42 prevents conduction by transistor 106 such that solenoid 104 cannot be energized, and exposure of the film is inhibited. When an open circuit or high resistance condition is input at contacts 56 and 55, transistor 106 conducts in response to signals output by timing logic block 102, and thereby energizes solenoid 104, to initiate exposure of the film. Of course, other suitable circuitry to detect the short circuit or low resistance condition and to inhibit film exposure responsive thereto could also be employed.

The illustrated flash system may be utilized with a camera of the scanning shutter type having a shutter releasable latch as is shown in the commonly assigned U.S. Pat. No. 3,995,295, issued Nov. 30, 1976 in the name of L. M. Douglas. In this arrangement, the shutter (not shown) which is spring driven open and solenoid closed is held closed by a mechanical latch; the latter automatically releasing the shutter upon powering up of the shutter solenoid, for example, by shutter movement or the magnetic field of the solenoid.

Actuation of the camera powers up the solenoid 104 by means of the timing logic chip 102. In the arrangement shown, the chip 102 essentially provides an initial pulse which renders transistor 106 conductive. Conduction of the latter, in turn powers up the solenoid 104 and releases the latch (not shown). The shutter remains closed since the solenoid 104 remains energized. At the end of the initial pulse, the transistor 106 is again rendered non-conductive so that the solenoid 104 is de-energized thereby allowing the shutter to open and an exposure cycle to sense. After an appropriate time interval, the chip 102 again pulses the transistor 106 into conduction to close the shutter and thereby terminate the film exposure. Note, however, that if a short exists across the terminals 56 and 55, the transistor 106 cannot be rendered conductive and the camera cannot be made to operate.

In the flash circuit of FIG. 5, the low resistance condition is provided between the outer terminals 42 and 48 by coupling the final radiant switch, switch 60, to the prior radiant switch 62, however, switch 60 could, of course, be connected directly to the conductor run 41. In any case, the switch 60 provides means for automatically altering the resistance between one of the two firing terminals (terminals 40 and 42 in FIG. 5) and the unused terminal (except for inhibiting) of the unit.

Many different arrangements are possible, for example, where appropriate camera circuitry is provided, the final flash indicator may be made to change from a low to a high resistance. Additionally, the inhibit condition may be provided between the center, or common terminal 40 and the unused terminal 48 by the circuit shown in FIG. 7. In the latter circuit, the upper array 18' includes a diode 82 coupled from the outer terminals 46-48 through the switch 60 to the center, common conductor run 40-44; the switch 60 being coupled at point 80 to this latter conductor run. Further, a mirror image is provided for the lower array 28' by means of a diode 83 in combination with the switch 61.

Since this arrangement places the sense condition, the low resistance, between the common terminal 40 and one of the outer terminals, the diodes will be subjected to the firing voltage depending on the position of the array on the camera. That is, the diode 82 must block the firing pulse voltage when the unit is inverted from its position shown in FIG. 7, otherwise the firing pulse would be shorted through the switch 60 and hence could not fire the lamps of array 28'.

Consequently, high voltage diodes having a peak back voltage of preferably twice the one to two kilovolts firing voltage of the lamps are employed in the embodiment of FIG. 7. Further, the sense and firing voltage polarity are made opposite to one another to provide proper conduction and blocking respectively, by the diodes 82 and 83. Hence, for this embodiment of FIG. 7, the center common terminal 40 or 44 is grounded, the sense voltage applied to terminal 48 (and subsequently to terminal 50) is made positive thereby allowing current flow through the diodes following the last flash, and the pulse voltage applied to terminal 42 (and subsequently to terminal 46) is made negative with respect to the common terminal so that the diode mounted across the array being fired will be in blocking arrangement to the firing voltage.

The flip flash unit may also be modified as shown in FIGS. 8 and 9 to eliminate the need for the low voltage diode of FIG. 5 or the high voltage diode of FIG. 7 by connecting one lead of each of the flash tabs 12 and 16 directly to the radiation responsive switches 60 and 61, respectively, rather than to the nonusable array of the selected orientation.

In this arrangement, the terminal 48 is connected to a conductor run 88 which in FIG. 8 extends outside of, and is disconnected from, the conductor run 94 of terminal 46 and array 28. A further conductor run 86 connects the run 88 to the radiation sensitive switch 60 and through the latter to the center terminals and 44. In like manner, terminal 50 of the tab 16 is connected only to the switch 61 associated with array 28 by means of conductor runs 90 and 92.

Hence, of the three terminals provided on a given tab, two are connected to one array while the third is connected solely to the radiation sensitive switch associated with the last lamp of that array. Consequently, as in the embodiment of FIG. 7, when the last lamp 20 is flashed in the array 18" (the unit being connected to the camera by tab 12 as shown in FIG. 8), the switch 60 closes or shorts such that a low resistance appears between camera terminals 54 and 55. However, since the terminal 48 is not connected to the array 28'", (except through the common conductor between 40 and 44), the latter short or low resistance (now across terminals 40–48) is not presented to the camera when the flash unit 10" is inverted and tab 16 inserted in the socket 14.

Still further arrangements are also possible. For example, while in the illustrated flash units the final flash indicator 60 changes from an initial open circuit condition to a short circuit condition, the reverse arrangement is possible. That is, the thermally activated switch element 60, coupled to the last flash, may also be altered from an initial shorted condition to an open circuit condition, with the sense and inhibit circuit for such a flash unit allowing camera operation when it records the initially shorted arrangement of the last bulb signal and preventing camera operation when that signal indicator goes to an open condition.

It is believed that the advantages and improved results furnished by the flash apparatus of the present invention are apparent from the foregoing description of the several embodiments of the invention and that various changes and modifications may be made without departing from the spirit and scope of the invention as sought to be defined in the claims that follow.

What is claimed is:

1. In a reversible photoflash unit carrying three terminals, and at least a first array and a second array of photoflash lamps, said lamps of said first array being electrically coupled between a first and a second of said terminals for sequential firing of said lamps of said first array and including a last lamp arranged to be fired last, and said lamps of said second array being electrically coupled between said first terminal and a third of said terminals for sequential firing of said lamps of said second array and including a last lamp arranged to be fired last, the improvement comprising means responsive to flashing of said last lamp of said first array for altering the electrical condition between one of said first or second terminals and said third terminal to provide an electrical condition at said third terminal following completion of lamp firing of said first array, and said means responsive to flashing of said last lamp of said first array comprises a unidirectional device configured for passing current in one direction to facilitate sensing said electrical condition and for blocking current in the opposite direction.

2. In a reversible photoflash unit carrying three terminals, and at least a first array and a second array of photoflash lamps, said lamps of said first array being electrically coupled between a first and a second of said terminals for sequential firing of said lamps of said first array and including a last lamp arranged to be fired last, and said lamps of said second array being electrically coupled between said first terminal and a third of said terminals for sequential firing of said lamps of said second array and including a last lamp arranged to be fired last, the improvement comprising means responsive to flashing of said last lamp of said first array for altering the electrical condition between said first and said third terminal to provide an electrical condition at said third terminal following completion of lamp firing of said first array, and said means responsive to flashing of said last lamp includes a radiant energy responsive switch element electrically coupled between said first terminal and said third terminal and operable between a high and low resistance condition responsive to flashing of said last lamp of said first array.

3. A flip flash photoflash unit comprising an elongated member carrying a first array of photoflash lamps at one end and a second array of photoflash lamps at the other end thereof, each said array including one lamp arranged to be fired as the last lamp of that array and a switch element adjoining the last lamp and operable between a low and high resistance condition responsive to firing of its respective last lamp, a first connector tab carried at said one end, a second connector tab carried at said other end, said first tab having three terminals with a pair thereof in electrical connection to said second array and the other terminal thereof solely in electrical connection to the switch element of said second array, and said second tab having three terminals with a pair thereof in electrical connection to said first array and the other terminal thereof solely in electrical connection to the switch element of said first array whereby said first array may be flashed and the condition of its last flash sensed when said second tab is employed and said second array may be flashed and the condition of its last lamp sensed when said first tab is employed.

4. In a reversible photoflash unit carrying three terminals, and at least a first array and a second array of photoflash lamps, said lamps of said first array being electrically coupled between a first and a second of said terminals for sequential firing of said lamps of said first array and including a last lamp arranged to be fired last, and said lamps of said second array being electrically coupled between said first terminal and a third of said terminals for sequential firing of said lamps of said second array and including a last lamp arranged to be fired last, said photoflash unit being an elongated member having said three terminals arranged at each end thereof with the terminals of one end being respectively coupled by conductive runs to the terminals of the other end such that said terminals are arranged in a reverse order at each end of said member, a first of said conductive runs being electrically coupled in common to both arrays, a second of said conductive runs being electrically coupled to said first array and a third of said conductive runs being electrically coupled to said second array, the improvement comprising:

means responsive to flashing of said last lamp of said first array for altering the electrical condition between one of said first or second terminals and said third terminal to provide an electrically detectable condition at said third terminal following completion of lamp firing of said first array; and means responsive to flashing of said last lamp of said second array for altering the electrical condition between one of said first or third terminals and said second terminal to provide an electrically detectable condition at said second terminal following completion of lamp firing of said second array;

said means responsive to flashing of said last lamp of said first array including a first circuit comprising a first unidirectional element in series with a first radiant energy responsive switch electrically coupled between said third conductive run and one of said first or second conductive runs, said first unidirectional element configured for passing sensing current in one direction from said third conductive run and for blocking current in the opposite direction; and said means responsive to flashing of said last lamp of said second array including means responsive to radiation from flashing of said last lamp of said second array for automatically altering the electrical condition between said second terminal and one of said first or third terminals to provide an electrically detectable condition at completion of lamp firing of said second array, said means responsive to flashing of said last lamp of said second array including a second circuit comprising a second unidirectional element in series with a second radiation sensitive switch electrically coupled between said second conductive run and one of said first or third conductive runs, said second unidirectional element configured for passing sensing current in one direction from said second conductive run and for blocking current in an opposite direction so that each unidirectional element permits passage of sensing current when the last flash of its associated array is fired but blocks current in the opposite direction.

5. The unit of claim 4 wherein said first and second circuits are coupled between said second and said third conductive runs with their respective unidirectional elements in opposite arrangement to each other.

6. The unit of claim 4 wherein said first circuit is electrically coupled across said first and third conductive runs, and said second circuit is electrically coupled across said first and said second conductive runs.

7. The unit of claim 6 wherein said first and second unidirectional elements are diode elements having a peak back voltage rating exceeding the firing voltage of said flash lamps.

8. The unit of claim 8 wherein said unidirectional elements are coupled to said conductive runs so as to block the passage of flash firing current when the latter is applied to the pair of terminals across which the respective diode is connected.

* * * * *